United States Patent
Glaser

(10) Patent No.: US 11,886,744 B2
(45) Date of Patent: Jan. 30, 2024

(54) SYSTEMS, METHODS, AND APPARATUSES FOR MAKING WRITES TO PERSISTENT MEMORY

(71) Applicant: NVIDIA CORPORATION, Santa Clara, CA (US)

(72) Inventor: Stephen David Glaser, San Francisco, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 97 days.

(21) Appl. No.: 17/644,470

(22) Filed: Dec. 15, 2021

(65) Prior Publication Data

US 2023/0185485 A1 Jun. 15, 2023

(51) Int. Cl.
G06F 3/06 (2006.01)

(52) U.S. Cl.
CPC .......... *G06F 3/0659* (2013.01); *G06F 3/0604* (2013.01); *G06F 3/0617* (2013.01); *G06F 3/0673* (2013.01)

(58) Field of Classification Search
CPC .... G06F 3/0604; G06F 3/0617; G06F 3/0673; G06F 3/0679; G06F 3/0611; G06F 3/061
See application file for complete search history.

(56) References Cited

U.S. PATENT DOCUMENTS

| | | | | |
|---|---|---|---|---|
| 2014/0136786 | A1* | 5/2014 | Carpenter | G06F 9/466 711/125 |
| 2016/0034225 | A1* | 2/2016 | Yoon | G06F 3/0619 711/102 |
| 2018/0189062 | A1* | 7/2018 | Baghsorkhi | G06F 9/3891 |
| 2019/0042445 | A1* | 2/2019 | Swaminathan | G06F 12/0873 |
| 2019/0339865 | A1* | 11/2019 | Bains | G06F 11/0751 |
| 2020/0242040 | A1* | 7/2020 | Iyer | G06F 12/0891 |
| 2020/0371914 | A1* | 11/2020 | Wang | G06F 12/0884 |
| 2022/0050600 | A1* | 2/2022 | Ramanujan | G06F 12/0868 |

(Continued)

OTHER PUBLICATIONS

Zhao, Jishen, et al. "Kiln: Closing the performance gap between systems with and without persistence support." Proceedings of the 46th Annual IEEE/ACM International Symposium on Microarchitecture. 2013.*

(Continued)

*Primary Examiner* — Tracy A Warren
(74) *Attorney, Agent, or Firm* — Moore & Van Allen PLLC; Michael M. McCraw

(57) ABSTRACT

A method, computer program product, apparatus, and system are provided. Some embodiments may include transmitting a request to make one or more writes associated with an identification tag. The request may include the identification tag, the one or more writes, a first instruction to make the one or more writes to one of a plurality of persistence levels of a memory, and a second instruction to respond with at least one first indication that the one or more writes associated with the identification tag have been written to at least one of the one of the plurality of persistence levels of the memory. Some embodiments may include receiving the at least one first indication that the one or more writes associated with the identification tag have been written to at least one of the one of the plurality of persistence levels of the memory.

24 Claims, 5 Drawing Sheets

(56) References Cited

U.S. PATENT DOCUMENTS

2022/0114102 A1* 4/2022 Wang .................. G06F 11/2015

OTHER PUBLICATIONS

Talpey, T. et al.; NFSv4; Internet Draft; "RDMA Extensions for Enhanced Memory Placement"; Mar. 2020; 3.1.1.1 RDMA Flush Request Format; Downloaded from the Internet Feb. 1, 2022 at: https://datatracker.ietf.org/doc/html/draft-talpey-rdma-commit-01#section-3.1.1.1; 39 pages.

Pmem.io; pmem API version 1.1; Downloaded from the Internet on Feb. 1, 2022 at: https://pmem.io/pmdk/manpages/linux/v1.5/libpmem/pmem_flush.3/; 5 pages.

Linux/UNIX System Programming Training; msync(2)—Linux Manual Page from Linux Programmer's Manual; Downloaded from the Internet on Feb. 1, 2022 at: https://man7.org/linux/man-pages/man2/msync.2.html; 3 pages.

Ruddoff, Andy and Byan, Steve; SDC Storage Developer Conference; SNIA; Santa Clara, CA, 2017; "All About Persistent Memory Flushing"; Downloaded from the Internet on Feb. 1, 2022 at: https://www.snia.org/sites/default/files/SDC/2017/presentations/Solid_State_Stor_NVM_PM_NVDIMM/Rudoff_Andy_Byan_Steve_All_About_Persistent_Memory_Flushing.pdf; 26 pages.

Gogte, Vaibhav et al.; "Software Wear Management for Persistent Memories"; 17th USENIX Conference on File and Storage Technologies (FAST '19); Feb. 25-28, 2019; Boston, MA, USA; USENIX Association; pp. 45-63.

Van Renen, Alexander, et al.; "Building Blocks for Persistent Memory"; The VLDB Journal (2020) 29:1223-1241.

Gromadzki, Tomasz, et al.; "Persistent Memory Replication Over Traditional RDMA Part 1: Understanding Remote Persistent Memory"; Downloaded from the Internet on Feb. 1, 2022 at: https://www.intel.com/content/www/us/en/developer/articles/technical/persistent-memory-replication-over-traditional-rdma-part-1-understanding-remote-persistent.html; 10 pages.

Tom Talpey; 2019, Mar. 23; 2019 OpenFabrics Workshop in Austin, from Microsoft presents: "RDMA Persistent Memory Extensions"; RDMA Persistent Memory Extensions [Video]. YouTube. https://www.youtube.com/watch?v=vOP0uw3pxSs&t=1192s.

SNIAVideo; 2017, Sep. 29; SDC 2017—All About Persistent Memory Flushing—Andy Rudoff [Video]. YouTube. https://youtu.be/FcKwqdZU5dk.

* cited by examiner

SYSTEMS, METHODS, AND APPARATUSES FOR MAKING WRITES TO PERSISTENT MEMORY

TECHNOLOGICAL FIELD

Embodiments of the present disclosure relate generally to methods, computer program products, apparatuses, and systems for transmitting requests to make one or more writes to persistent memory.

BACKGROUND

Data may be written to persistent memory such that, for example, the data may continue to be stored after power is removed from the computing system and may be accessed once power is restored to the computing system. Persistent memory may include multiple persistence levels that each correspond to an amount of time that the data will remain in the persistent memory and/or the durability of the storage. Applicant has identified a number of deficiencies associated with present methods, computer program products, apparatuses, and systems for making writes to particular levels of persistent memory and ensuring that the writes have been made to the particular levels of persistent memory. Through applied effort, ingenuity, and innovation, many of these identified problems have been solved by developing solutions that are included in embodiments of the present disclosure, many examples of which are described in detail herein.

BRIEF SUMMARY

In an embodiment, a method is provided. The method includes transmitting a request to make one or more writes associated with an identification tag. The request includes the identification tag, the one or more writes, a first instruction to make the one or more writes to one of a plurality of persistence levels of a memory, and a second instruction to respond with at least one first indication that at least one of the one or more writes associated with the identification tag have been written to the one of the plurality of persistence levels of the memory. The method further includes receiving the at least one first indication that at least one of the one or more writes associated with the identification tag have been written to the one of the plurality of persistence levels of the memory.

In some embodiments, the request further includes a third instruction to make the one or more writes associated with the identification tag visible and a fourth instruction to respond with at least one second indication that at least one of the one or more writes associated with the identification tag have reached the point of visibility. In some embodiments, the method further includes receiving the at least one second indication that at least one of the one or more writes associated with the identification tag have reached the point of visibility. In some embodiments, the at least one of the first indication is received before the at least one second indication. In some embodiments, the at least one of the second indication is received before the at least one first indication. In some embodiments, the at least one first indication and the at least one second indication are received at the same time.

In some embodiments, each persistence level of the plurality of persistence levels corresponds to an amount of time that the one or more writes associated with the identification tag will be stored at each persistence level of the plurality of persistence levels.

In some embodiments, the request is transmitted using peripheral component interconnect express standards.

In another embodiment, a computer program product is provided. The computer program product may be configured to transmit a request to make one or more writes associated with an identification tag. The request the identification tag, the one or more writes, a first instruction to make the one or more writes to one of a plurality of persistence levels of a memory, and a second instruction to respond with at least one first indication that at least one of the one or more writes associated with the identification tag have been written to the one of the plurality of persistence levels of the memory. The computer program product may be further configured to receive the at least one first indication that at least one of the one or more writes associated with the identification tag have been written to the one of the plurality of persistence levels of the memory.

In some embodiments, the request may further include a third instruction to make the one or more writes associated with the identification tag visible and a fourth instruction to respond with at least one second indication that at least one of the one or more writes associated with the identification tag have reached the point of visibility. In some embodiments, the computer program product may be further configured to receive the at least one second indication that at least one of the one or more writes associated with the identification tag have reached the point of visibility. In some embodiments, the at least one first indication is received before the at least one second indication. In some embodiments, the at least one second indication is received before the at least one first indication. In some embodiments, the at least one first indication and the at least one second indication are received at the same time.

In some embodiments, each persistence level of the plurality of persistence levels corresponds to an amount of time that the one or more writes associated with the identification tag will be stored at each persistence level of the plurality of persistence levels.

In some embodiments, the request is transmitted using peripheral component interconnect express standards.

In yet another embodiment, an apparatus is provided. The apparatus may be caused to transmit a request to make one or more writes associated with an identification tag. The request may include the identification tag, the one or more writes, a first instruction to make the one or more writes to one of a plurality of persistence levels of a memory, and a second instruction to respond with at least one first indication that at least one of the one or more writes associated with the identification tag have been written to the one of the plurality of persistence levels of the memory. The apparatus may be further caused to receive the at least one first indication that at least one of the one or more writes associated with the identification tag have been written to the one of the plurality of persistence levels of the memory.

In some embodiments, the request may further include a third instruction to make the one or more writes associated with the identification tag visible and a fourth instruction to respond with at least one second indication that at least one of the one or more writes associated with the identification tag have reached the point of visibility. In some embodiments, the apparatus may be further caused to receive the at least one second indication that at least one of the one or more writes associated with the identification tag have reached the point of visibility. In some embodiments, the request is transmitted using peripheral component interconnect express standards.

In yet another embodiment, a system is provided. The system may include a requester having a first processor and a first memory including first computer program code. The requester may be caused to transmit a request to make one or more writes associated with an identification tag. The request may include the identification tag, the one or more writes, a first instruction to make the one or more writes to one of a plurality of persistence levels of a second memory, and a second instruction to respond with at least one first indication that at least one of the one or more writes associated with the identification tag have been written to the one of the plurality of persistence levels of the second memory. The requester may be further caused to receive the at least one first indication that at least one of the one or more writes associated with the identification tag have been written to the one of the plurality of persistence levels of the second memory. The system may further include a completer having a second processor and the second memory including second computer program code. The completer may be caused to receive the request to make the one or more writes associated with the identification tag. The completer may be further caused to write the one or more writes associated with the identification tag to the one of the plurality of persistence levels of the second memory. The completer may be further caused to transmit the at least one first indication to the requester that at least one of the one or more writes associated with the identification tag have been written to the one of the plurality of persistence levels of the second memory.

In some embodiments, the request may further include a third instruction to make the one or more writes associated with the identification tag visible and a fourth instruction to respond with at least one second indication that at least one of the one or more writes associated with the identification tag have reached the point of visibility. In some embodiments, the requester may be further caused to receive the at least one second indication that at least one of the one or more writes associated with the identification tag have reached the point of visibility. In some embodiments, the request may be transmitted using peripheral component interconnect express standards.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
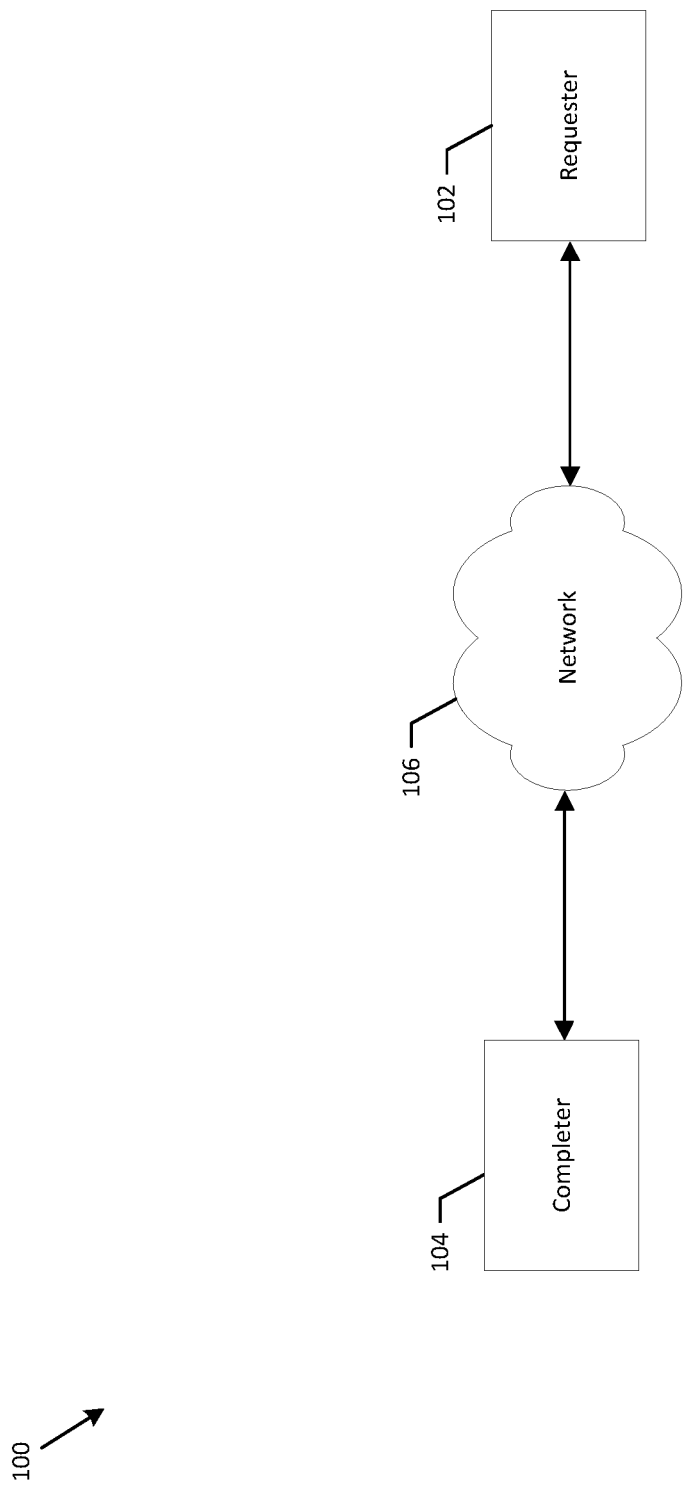
FIG. 1 illustrates a system for making one or more writes to persistent memory in accordance with one or more embodiments of the present invention.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout.

In computing systems, data may be written and stored in volatile memory or persistent memory (e.g., non-volatile memory). In general, data stored in volatile memory may be lost once power is removed from a computing system and is not accessible after power is restored to the computing system. In contrast, in general, data stored in persistent memory may continue to be stored after power is removed from the computing system and may be accessed once power is restored to the computing system. In some computing systems, there may be multiple levels or domains of persistent memory, with each level of the persistent memory corresponding to an amount of time that the data will remain in the persistent memory and/or to the durability of the data in the persistent memory (e.g. durability against an adverse event, such as cosmic rays). Additionally, data may be written to be visible (e.g. visible to subsequent requesters of the data). During the process of writing the data to be visible, it may reach a point, called a point of visibility, in which, once the data is past the point, it is known that the data will be visible to all subsequent requesters of the data (e.g. subsequent requesters will be able to accurately read the data once written to be visible), including requesters other than the requesters that requested that the data be written to the memory. As such, due to the storage differences between different levels of persistent memory and the advantages of writing data to be visible, it is desirable to not only know when a write has been made to persistent memory, but also to know what level of persistent memory the write has been made to and also when the write has reached the point of visibility.

There are a number of deficiencies and problems associated with present methods, computer program products, apparatuses, and systems for making writes to persistent memory and determining the level of persistent memory to which the write has been made. For example, current methods often fail to include issuing a single standardized request that includes an instruction to make writes to particular levels of persistent memory and/or to be visible and also an instruction to respond once the write has been made to a particular level of persistent memory and/or reached the point of persistence, thus, adding complication and increasing latency. Accordingly, Applicant has developed methods, computer program products, apparatuses, and systems in which one request is sent that includes an instruction to make a write to a particular level of persistent memory and an instruction to respond with an indication when the write has been made to the particular level of the persistent memory and/or reached the point of visibility, as described below in accordance with embodiments of the present invention.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit or a similar integrated circuit in a server, a network device, and/or other computing device.

As used herein, a "computer-readable storage medium," which refers to a physical storage medium (e.g., volatile or non-volatile memory device), may be differentiated from a "computer-readable transmission medium," which refers to an electromagnetic signal.

Figure 2:
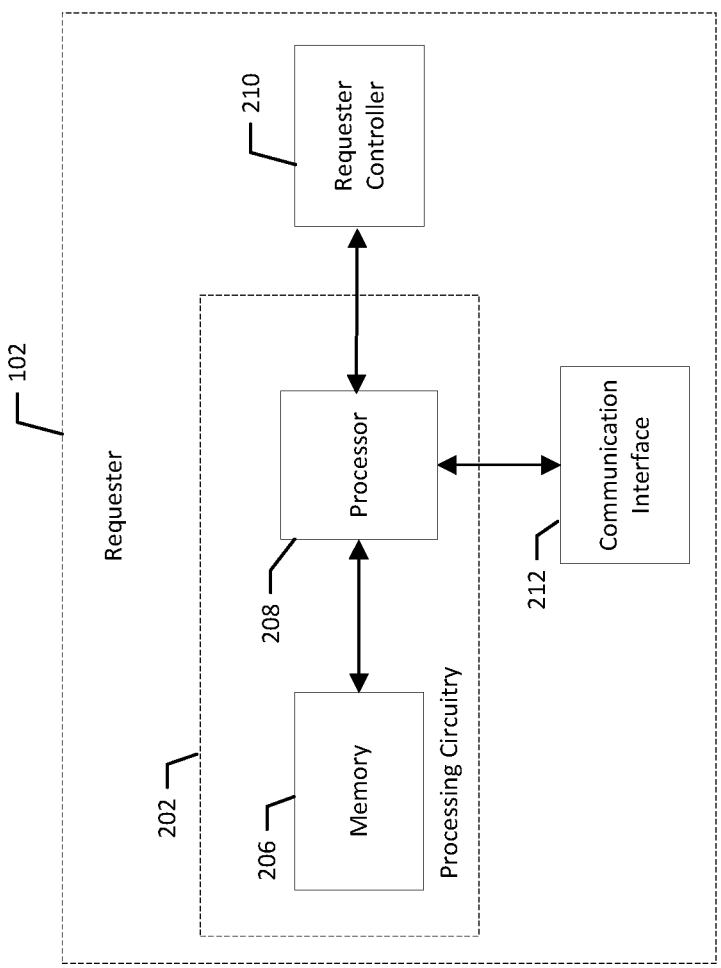
FIG. 2 illustrates a block diagram of a requester in accordance with one or more embodiments of the present invention.
Figure 3:
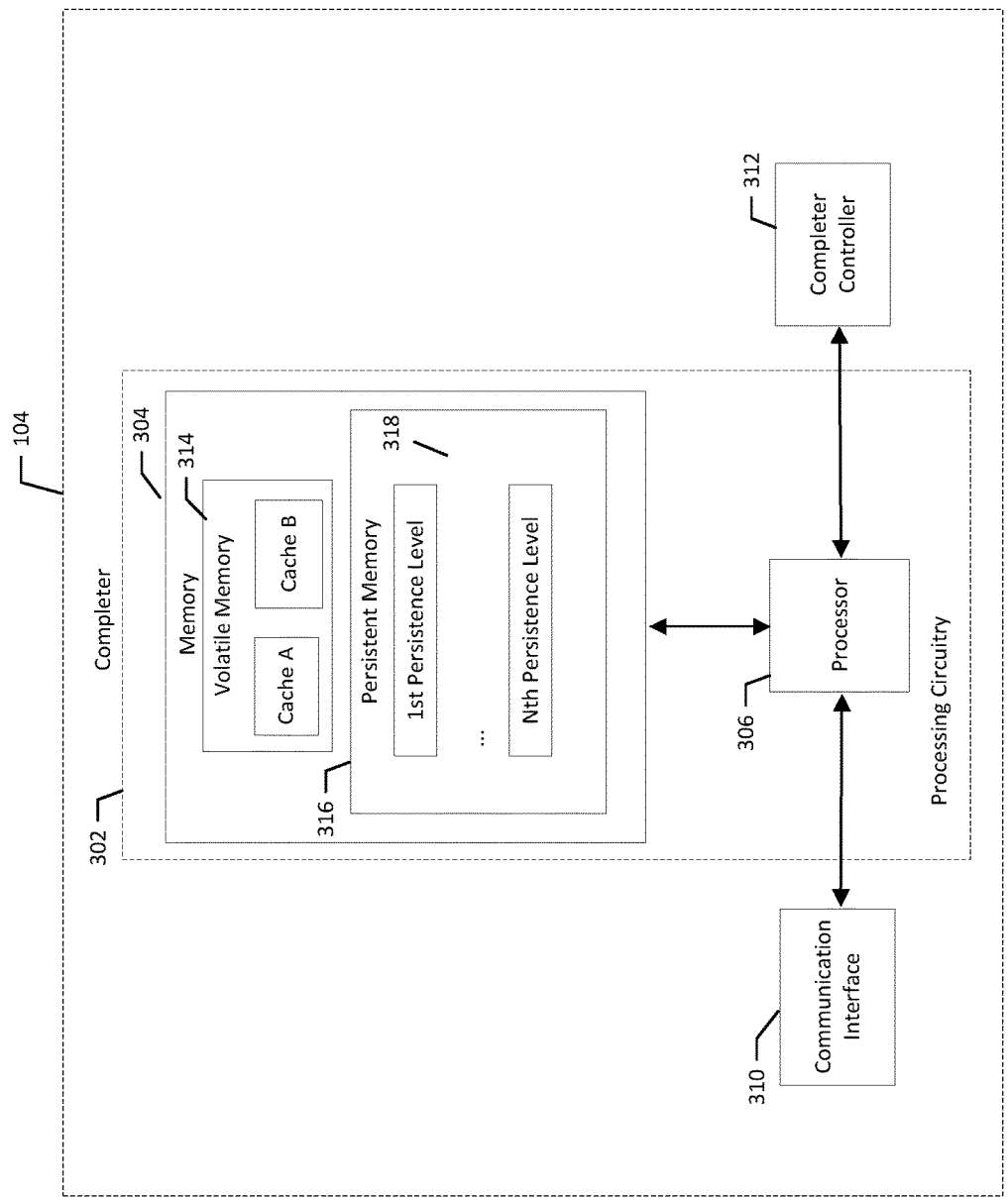
FIG. 3 illustrates a block diagram of a completer in accordance with one or more embodiments of the present invention.

With reference to FIGS. 1-3, a system 100 is illustrated for making one or more writes to persistent memory. It will be appreciated that the system 100 is provided as an example of an embodiment(s) and should not be construed to narrow the scope or spirit of the disclosure in any way. In this regard, the scope of the disclosure encompasses many potential embodiments in addition to those illustrated and described herein. As such, while FIGS. 1-3 illustrate one example of a configuration of a system for making writes to persistent memory, numerous other configurations may also be used to implement embodiments of the present disclosure.

The system 100 may include a requester 102, which may be configured to transmit a request for making one or more writes to persistent memory. While one such requester 102 is illustrated in FIGS. 1-3, it will be appreciated that this illustration is by way of example, and not by way of limitation, as the system 100 may include additional requesters. The requester 102 may be embodied on any type of computing device. The system 100 may also include a completer 104, which may be configured to make the one or more writes to persistent memory and transmit an indication that the one or more writes have been made to persistent memory. While one such completer 104 is illustrated in FIGS. 1-3, it will be appreciated that this illustration is by way of example, and not by way of limitation, as the system 100 may include additional completers. The completer 104 may be embodied on any type of computing device.

In various example embodiments, the requester 102 and the completer 104 may be configured to connect to one or more networks 106 via a variety of wireless and/or wireline connections. For example, the requester 102 and the completer 104 may be configured to access the network 106 via a cellular connection, wireless local area network connection, Ethernet connection, and/or the like. As such, the network 106 may comprise a wireline network, wireless network (e.g., a cellular network, wireless local area network, wireless wide area network, some combination thereof, or the like), or a combination thereof, and in some example embodiments comprises at least a portion of the Internet.

With reference to FIG. 2 a block diagram of the requester 102 is illustrated in accordance with some example embodiments. However, it should be noted that the components, devices or elements illustrated in and described with respect to FIG. 2 below may not be mandatory and thus one or more may be omitted in certain embodiments. Additionally, some embodiments may include further or different components, devices or elements beyond those illustrated in and described with respect to FIG. 2.

The requester 102 may include or otherwise be in communication with processing circuitry 202 that is configurable to perform actions in accordance with one or more example embodiments disclosed herein. In this regard, the processing circuitry 202 may be configured to perform and/or control performance of one or more functionalities of the requester 102 in accordance with various example embodiments, and thus may provide means for performing functionalities of the requester 102 in accordance with various example embodiments. The processing circuitry 202 may be configured to perform data processing, application execution and/or other processing and management services according to one or more example embodiments. In some embodiments, the requester 102 or a portion(s) or component(s) thereof, such as the processing circuitry 202, may be embodied as or comprise a chip or chip set. In other words, the requester 102 or the processing circuitry 202 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The requester 102 or the processing circuitry 202 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 202 may include a processor 208 and, in some embodiments, such as that illustrated in FIG. 2, may further include memory 206. The processing circuitry 202 may be in communication with or otherwise control a communication interface 212 and/or a requester controller 210. As such, the processing circuitry 202 may be embodied as a circuit chip (e.g., an integrated circuit chip) configured (e.g., with hardware, software or a combination of hardware and software) to perform operations described herein.

The processor 208 may be embodied in a number of different ways. For example, the processor 208 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 208 may comprise a plurality of processors. The plurality of processors may be in operative communication with each other and may be collectively configured to perform one or more functionalities of the requester 102 as described herein. The plurality of processors may be embodied on a single computing device or distributed across a plurality of computing devices collectively configured to function as the requester 102. In some example embodiments, the processor 208 may be configured to execute instructions stored in the memory 206 or otherwise accessible to the processor 208. As such, whether configured by hardware or by a combination of hardware and software, the processor 208 may represent an entity (e.g., physically embodied in circuitry—in the form of processing circuitry 202) capable of performing operations according to embodiments of the present invention while configured accordingly. Thus, for example, when the processor 208 is embodied as an ASIC, FPGA or the like, the processor 208 may be specifically configured hardware for conducting the operations described herein. Alternatively, as another example, when the processor 208 is embodied as an executor of software instructions, the instructions may specifically configure the processor 208 to perform one or more operations described herein.

In some example embodiments, the memory 206 may include one or more non-transitory memory devices such as, for example, volatile and/or non-volatile memory that may be either fixed or removable. In this regard, the memory 206 may comprise a non-transitory computer-readable storage medium. It will be appreciated that while the memory 206 is illustrated as a single memory, the memory 206 may comprise a plurality of memories. The plurality of memories may be embodied on a single computing device or may be distributed across a plurality of computing devices collectively configured to function as the requester 102. The memory 206 may be configured to store information, data, applications, instructions and/or the like for enabling the requester 102 to carry out various functions in accordance with one or more example embodiments. For example, the memory 206 may be configured to buffer input data for processing by the processor 208. Additionally or alternatively, the memory 206 may be configured to store instructions for execution by the processor 208. As yet another alternative, the memory 206 may include one or more databases that may store a variety of files, contents or data sets. Among the contents of the memory 206, applications may be stored for execution by the processor 208 in order to carry out the functionality associated with each respective application. In some cases, the memory 206 may be in communication with one or more of the processor 208, communication interface 212, or the requester controller 210 via a bus(es) for passing information among components of the requester 102.

In some example embodiments, the requester 102 may further include a communication interface 212. In some cases, the communication interface 212 may be any means such as a device or circuitry embodied in either hardware, or a combination of hardware and software that is configured to receive and/or transmit data from/to a network and/or any other device or circuitry in communication with the processing circuitry 202. By way of example, the communication interface 212 may be configured to enable the requester 102 to communicate with the completer 104. Accordingly, the communication interface 212 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods. Communication interface 212 may be configured to receive and/or transmit any data that may be stored in memory 206 or other memory (such as a memory 304 of the completer 104) using any protocol that may be used for communications between devices, such as Peripheral Component Interconnect Express ("PCIe") or Remote Direct Memory Access ("RDMA") protocol.

In some example embodiments, the requester 102 may include or otherwise control a requester controller 210. As such, the requester controller 210 may be embodied as various means, such as circuitry, hardware, a computer program product comprising computer readable program instructions stored on a computer readable medium (for example, the memory 206) and executed by a processing device (for example, the processor 208), or some combination thereof. The requester controller 210 may be capable of communication with one or more of the memory 206 or communication interface 212 to access, receive, and/or send data as may be needed to perform one or more of the functionalities of the requester controller 210 as described herein.

FIG. 3 illustrates a block diagram of the completer 104 in accordance with some example embodiments. However, it should be noted that the components, devices or elements illustrated in and described with respect to FIG. 3 below may not be mandatory and thus one or more may be omitted in certain embodiments. Additionally, some embodiments may include further or different components, devices or elements beyond those illustrated in and described with respect to FIG. 3.

The completer 104 may include or otherwise be in communication with processing circuitry 302 that is configurable to perform actions in accordance with one or more example embodiments disclosed herein. In this regard, the processing circuitry 302 may be configured to perform and/or control performance of one or more functionalities of the completer 104 in accordance with various example embodiments, and thus may provide means for performing functionalities of the completer 104 in accordance with various example embodiments. The processing circuitry 302 may be configured to perform data processing, application execution and/or other processing and management services according to one or more example embodiments. In some embodiments, the completer 104 or a portion(s) or component(s) thereof, such as the processing circuitry 302, may be embodied as or comprise a chip or chip set. In other words, the completer 104 or the processing circuitry 302 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The completer 104 or the processing circuitry 302 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 302 may include a processor 306 and, in some embodiments, such as that illustrated in FIG. 3, may further include memory 304. The processing circuitry 302 may be in communication with or otherwise control a communication interface 310, and/or a completer controller 312. As such, the processing circuitry 302 may be embodied as a circuit chip (e.g., an integrated circuit chip) configured (e.g., with hardware, software or a combination of hardware and software) to perform operations described herein.

The processor 306 may be embodied in a number of different ways. For example, the processor 306 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 306 may comprise a plurality of processors. The plurality of processors may be in operative communication with each other and may be collectively configured to perform one or more functionalities of the completer 104 as described herein. In some example embodiments, the processor 306 may be configured to execute instructions stored in the memory 304 or otherwise accessible to the processor 306. As such, whether configured by hardware or by a combination of hardware and software, the processor 306 may represent an entity (e.g., physically embodied in circuitry—in the form of processing circuitry 302) capable of performing operations according to embodiments of the present disclosure while configured accordingly. Thus, for example, when the processor 306 is embodied as an ASIC, FPGA or the like, the processor 306 may be specifically configured hardware for conducting the operations described herein. Alternatively, as another example, when the processor 306 is embodied as an executor of software instructions, the instructions may specifically configure the processor 306 to perform one or more operations described herein.

In some example embodiments, the memory 304 may include one or more non-transitory memory devices such as, for example and as illustrated in FIG. 3, volatile memory 314 and/or non-volatile memory (e.g., persistent memory 316 in which data stored on the device is retained for an amount of time after power has been turned off from the device) that may be either fixed or removable. In this regard, the memory 304 may comprise a non-transitory computer-readable storage medium. In some embodiments, the memory 304, may include one or more caches. For example, the memory 304 may include Cache A and Cache B. In some embodiments, such as shown in FIG. 3, Cache A and Cache B may be volatile memory. In some embodiments, Cache A and Cache B may comprise cache lines (e.g. blocks of data). In some embodiments, Cache A and Cache B may each have copies of a cache line. In some embodiments, Cache A and Cache B may be coherent such that, if Cache A and Cache B each have a copy of a cache line, each copy of the cache line comprises the same data.

In some embodiments, the persistent memory 316 may include a plurality of persistence levels 318 (e.g., the $1^{st}$ persistence level). In this regard, each of the plurality of persistence levels 318 may correspond to an amount of time that the one or more writes associated with the identification tag (as described below) will be stored at each persistence level of the plurality of persistence levels 318 (e.g., 6 months versus 2 years). Additionally or alternatively, each of the plurality of persistence levels 318 may correspond to the durability of the data stored at each persistence level of the plurality of persistence levels 318. In this regard, durability may correspond to the durability of the one or more writes in relation to any adverse event (e.g. loss of power to the memory, cosmic rays, physical damage to the memory). For example, data written at a particular persistence level may be less susceptible to being corrupted by physical damage to the memory than data written at a different persistence level.

The memory 304 may be configured to store information, data, applications, instructions and/or the like for enabling the completer 104 to carry out various functions in accordance with one or more example embodiments. For example, the memory 304 may be configured to buffer input data for processing by the processor 306. Additionally or alternatively, the memory 304 may be configured to store instructions for execution by the processor 306. As yet another alternative, the memory 304 may include one or more databases that may store a variety of files, contents or data sets. Among the contents of the memory 304, applications may be stored for execution by the processor 306 in order to carry out the functionality associated with each respective application. In some cases, the memory 304 may be in communication with one or more of the processor 306, communication interface 310, or completer controller 312 via a bus(es) for passing information among components of the completer 104.

The communication interface 310 may include one or more interface mechanisms for enabling communication with other devices and/or networks. In some cases, the communication interface 310 may be any means such as a device or circuitry embodied in either hardware, or a combination of hardware and software that is configured to receive and/or transmit data from/to a network and/or any other device or module in communication with the processing circuitry 302. By way of example, the communication interface 310 may be configured to enable the completer 104 to communicate with the requester 102 via the network 106. Accordingly, the communication interface 310 may, for example, include an antenna (or multiple antennas) and supporting hardware and/or software for enabling communications with a wireless communication network (e.g., a wireless local area network, cellular network, global positioning system network, and/or the like) and/or a communication modem or other hardware/software for supporting communication via cable, digital subscriber line (DSL), universal serial bus (USB), Ethernet or other methods. Communication interface 310 may be configured to receive and/or transmit any data that may be stored in memory 304 using any protocol that may be used for communications between devices, such as PCIe.

In some embodiments, the completer 104 may include or otherwise control a completer controller 312. As such, the completer controller 312 may be embodied as various means, such as circuitry, hardware, a computer program product comprising computer readable program instructions stored on a computer readable medium (for example, the memory 304) and executed by a processing device (for example, the processor 306), or some combination thereof. The completer controller 312 may be capable of communication with one or more of the memory 304 or communication interface 310 to access, receive, and/or send data as may be needed to perform one or more of the functionalities of the completer controller 312 as described herein.

In some embodiments, the system 100 may be configured for making one or more writes to persistent memory. In this regard, the system 100 may be configured to transmit a request to make one or more writes (e.g., of data) to one of a plurality of persistence levels 318 of the memory 304 and to receive an indication that the one or more writes have been made to the one of the plurality of persistence levels 318. As described above, each of the plurality of persistence levels 318 may correspond to an amount of time that the one or more writes associated with the identification tag (as described below) will be stored at each persistence level of the plurality of persistence levels 318 and/or the durability of the one or more writes associated with the identification tag stored at each persistence level of the plurality of persistence levels 318.

In some embodiments, the request may be sent by the requester 102 to the completer 104, such a via the network 106. In some embodiments, the request may include an identification tag configured to identify the requester 102, the one or more writes, a first instruction to make the one or more writes to the one of the plurality of persistence levels 318 of the memory 304 (e.g., to a $4^{th}$ persistence level of the memory 304 of the completer 104) based on the amount of desired storage time or durability in the memory 304, and a second instruction to respond with at least one first indication once at least one of the one or more writes have been written to the one of the plurality of persistence levels 318 of the memory 304 (e.g., the second instruction directing the completer 104 to respond to the requester 102 with the at least one first indication once a write has been made to one of the persistence levels of the memory 304 of the completer). In some embodiments, the first instruction may instruct the completer 104 to make some of the one or more writes to one persistence level and other writes of the one or more writes to a different persistence level (e.g. instruct the completer 104 to make two writes to the $4^{th}$ persistence level of the memory 304 and make three writes to a $2^{nd}$ persistence level of the memory 304). Additionally or alternatively, in some embodiments, the request sent by the requester 102 to the completer 104 may include a third instruction to make the one or more writes associated with the identification tag visible and, in some embodiments, a fourth instruction to the completer 104 to respond to the requester 102 with at least one second indication that at least one of the one or more writes associated with the identification tag has reached a point of visibility such that the one or more writes may be visible to requesters other than the requester that made the write. In some embodiments, the request may be transmitted using PCIe standards.

In some embodiments, the requester 102 may receive the at least one first indication from the completer 104 that at least one of the one or more writes associated with the identification tag have been written to the one of the plurality of persistence levels 318 of the memory 304. In some embodiments, the at least one first indication received from the completer 104 may indicate that all of the one or more writes transmitted by the requester 102 have been written to the one of the plurality of persistence levels 318. For example, if five writes were made to the $4^{th}$ persistence level, the first indication could indicate that the five writes associated with the identification tag have been written to the $4^{th}$ persistence level of the memory 304. In some embodiments the at least one first indication received from the completer 104 may indicate that only some of the one or more writes transmitted by the requester 102 have been written to the one of the plurality of persistence levels 318. In some embodiments, the requester 102 may receive multiple first indications with each first indication indicating that some of the one or more writes have been written to the one of the plurality of persistence levels 318. For example, if four writes were made to the $4^{th}$ persistence level, one first indication could indicate that three writes associated with the identification tag have been written to the $4^{th}$ persistence level of the memory 304 and another first indication could indicate that one write had been written to the $4^{th}$ persistence level of the memory 304.

Similarly, the requester 102 may receive the at least one second indication from the completer 104 that at least one of the one or more writes associated with the identification tag have reached the point of visibility. In some embodiments, the at least one second indication received from the completer 104 may indicate that all of the one or more writes transmitted by the requester 102 have reached the point of visibility. For example, if five writes have reached the point of visibility, the at least one second indication could indicate that the five writes associated with the identification tag have reached the point of visibility. In some embodiments, the at least one second indication received from the completer 104 may indicate that only some of the one or more writes transmitted by the requester 102 have reached the point of visibility. In some embodiments, the requester 102 may receive multiple second indications with each second indication indicating that some of the one more writes have reached the point of visibility. For example, if four writes have reached the point of visibility, one second indication could indicate that three writes associated with the identification tag have reached the point of visibility and another second indication could indicate that one write has reached to the point of visibility. In some embodiments, the at least one first indication and the at least one second indication may be combined into one indication. In other words, in some embodiments, the requester 102 may receive an indication that at least one of the one or more writes has been written to one of the plurality of persistence levels 318 of the memory 304 and also reached the point of visibility.

In some embodiments, the completer 104 may receive the request to make the one or more writes associated with the identification tag. The completer 104 may, in accordance with the request, write the one or more writes associated with the identification tag to the one of the plurality of persistence levels 318 of the memory 304 and transmit the at least one first indication to the requester 102 that at least one of the one or more writes associated with the identification tag have been written to the one of the plurality of persistence levels 318 of the memory 304. Additionally or alternatively, the completer 104 may, in accordance with the request, write the one or more writes associated with the identification tag to be visible and transmit the at least one second indication to the requester 102 that at least one of the one or more writes associated with the identification tag have reached the point of visibility.

Figure 4:
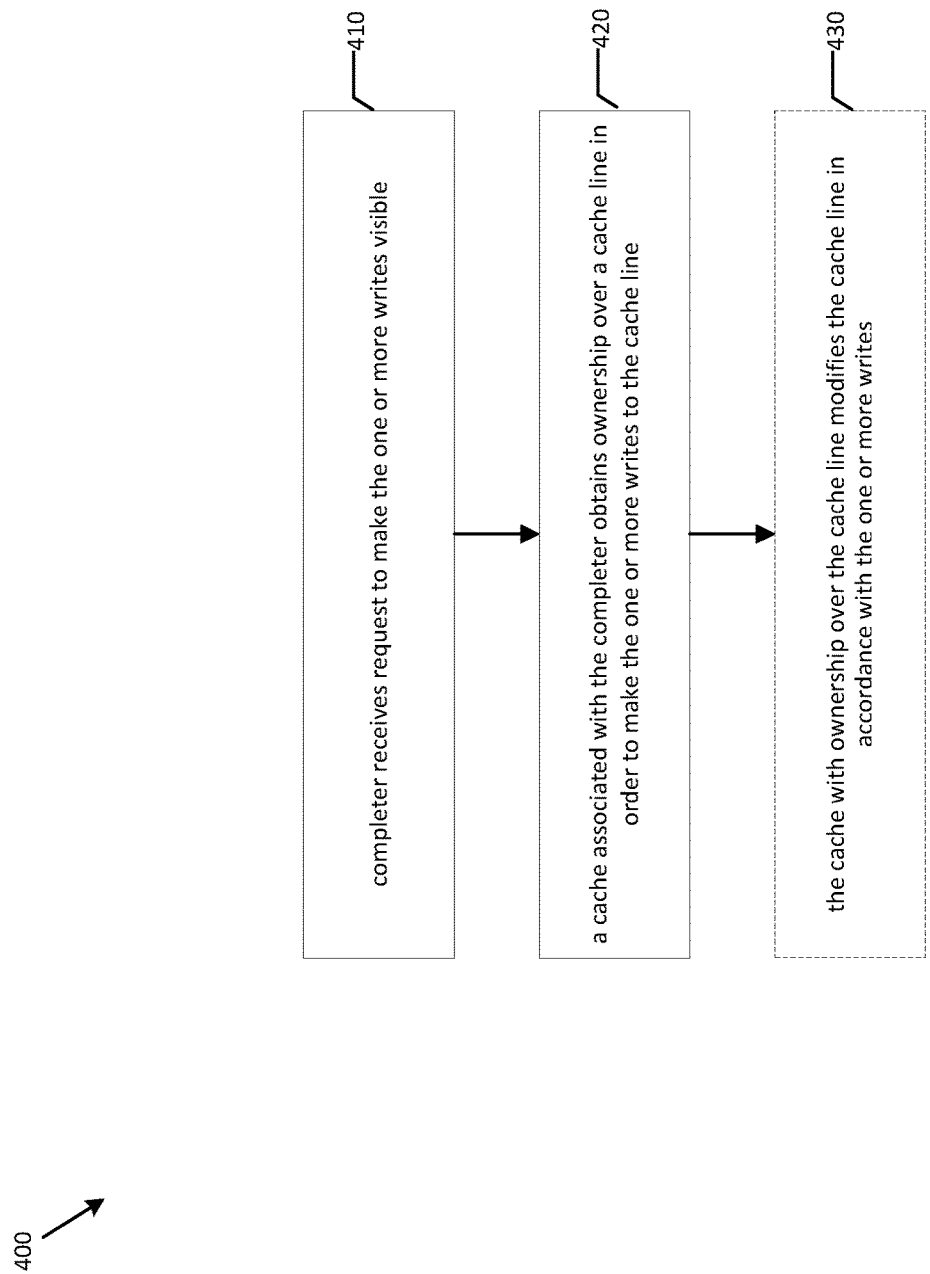
FIG. 4 illustrates a flowchart for performing a process in accordance with one or more embodiments of the present invention.

Referring now to FIG. 4, a flowchart is illustrated according to an example process for how the one or more writes may reach the point of visibility. As described above, the point of visibility (or point of coherence) may represent a point in which, once a request to write data to be visible is past the point, it is known that the data will be visible to all subsequent requesters of the data (e.g. all subsequent requesters will be able to accurately read the data once written to be visible), including requesters other than the requester that made the request for the data to be written. As shown in block 410, the process 400 begins with the completer receiving the request to make the one or more writes visible. In some example implementations, the one or more writes may make modifications to a cache line stored on the completer. As shown in block 420, the process 400 continues by a cache associated with the completer obtaining ownership over the cache line in order to make the one or more writes to the cache line. In some example implementations, once a cache has ownership of the cache line, it is the only cache that may make changes to the cache line. Additionally, in some example implementations, any subsequent requests (e.g., by another cache, persistent memory, etc.) to read the cache line will have to ask the cache that has ownership of the cache line. As such, once a cache has ownership over the cache line, the one or more writes will have reached the point of visibility because no other cache will be able to modify the cache line and all subsequent requests to read the cache line will have ask the cache that has ownership over the cache line. As shown in block 430, the process 400 may optionally continue with the cache that has ownership over the cache line making the modifications to the cache line in accordance with the one or more writes.

Figure 5:
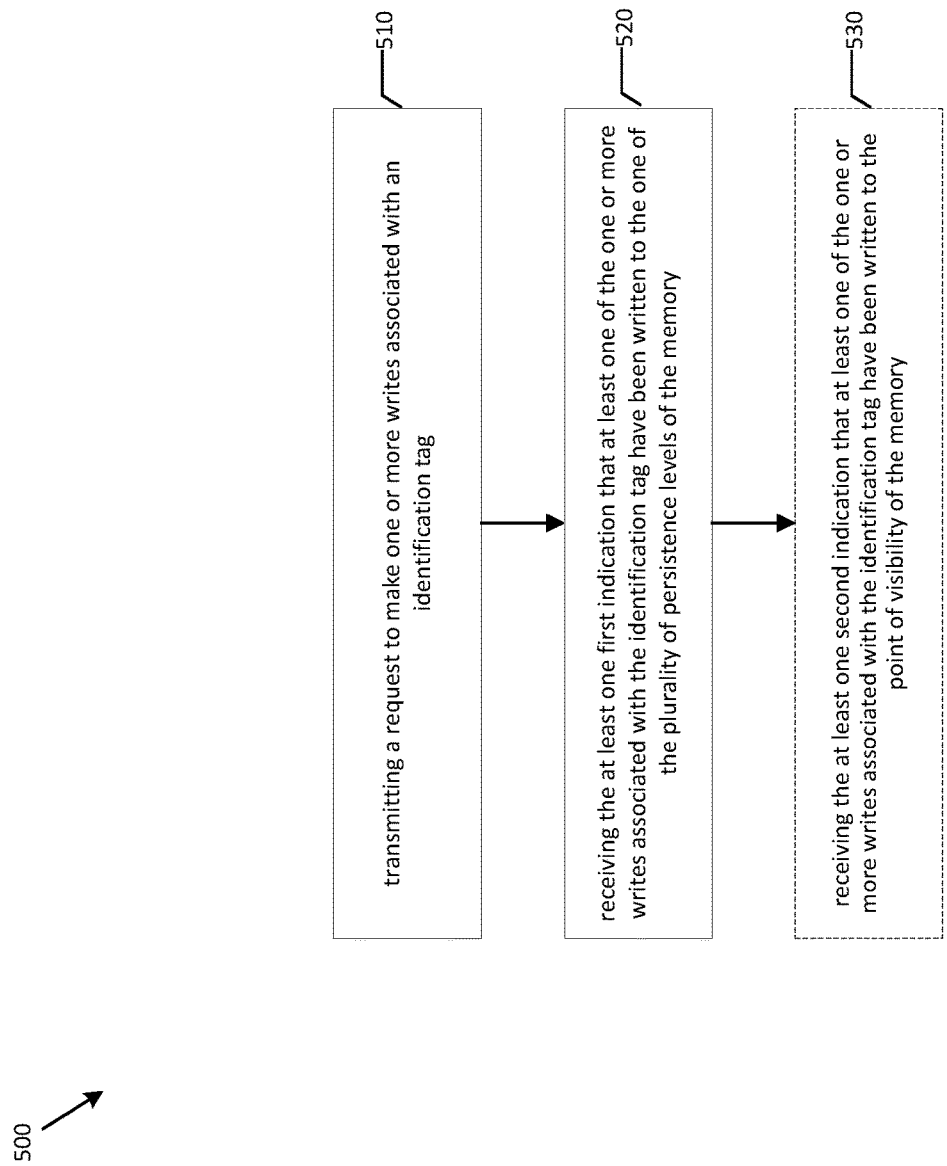
FIG. 5 illustrates a flowchart for performing a process in accordance with one or more embodiments of the present invention.

Referring now to FIG. 5, a flowchart is illustrated according to an example process 500 for transmitting a request to make one or more writes (e.g., of data) to one of a plurality of persistence levels 318 of the persistent memory 316 and for receiving an indication that the one or more writes have been made to the one of the plurality of persistence levels 318 of the persistent memory 316. In this regard, FIG. 4 illustrates operations that may be performed by the requester 102 and/or the completer 104. The operations illustrated in and described with respect to FIG. 5 may, for example, be performed by, with the assistance of, and/or under the control of one or more of the processing circuitry 202, processor 208, memory 206, communication interface 212, requester controller 210, processing circuitry 302, processor 306, memory 304, communication interface 310, and/or completer controller 312.

As shown at block 510, the process 500 begins with transmitting a request to make one or more writes associated with an identification tag. The request may include the identification tag, the one or more writes, a first instruction to make the one or more writes to one of a plurality of persistence levels of a memory, and a second instruction to respond with at least one first indication that at least one of the one or more writes associated with the identification tag have been written to the one of the plurality of persistence levels of the memory.

As shown at block 520, the process 500 continues with receiving the at least one first indication that at least one of the one or more writes associated with the identification tag have been written to the one of the plurality of persistence levels of the memory. In some example implementations, the request further comprises a third instruction to make the one or more writes associated with the identification tag to a point of visibility and a fourth instruction to respond with at least one second indication that at least one of the one or more writes associated with the identification tag have been written to the point of visibility. In some example implementations, each persistence level of the plurality of persistence levels corresponds to an amount of time that the one or more writes associated with the identification tag will be stored at each persistence level of the plurality of persistence levels. In some example implementations, the request is transmitted using peripheral component interconnect express standards.

As shown at block 530, the process 500 may optionally include receiving the at least one second indication that at least one of the one or more writes associated with the identification tag have been written to the point of visibility. In some example implementations, the at least one first indication is received before the at least one second indication. In some example implementations, the at least one second indication is received before the at least one first indication. In some example implementations, the at least one first indication and the at least one second indication are received at the same time.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a descriptive sense and not for purposes of limitation.

That which is claimed:

1. A method comprising:
    transmitting a request to make one or more writes associated with an identification tag, the request comprising:
        the identification tag,
        the one or more writes,
        a first instruction to make the one or more writes to one of a plurality of persistence levels of a memory,
        a second instruction to respond with at least one first indication that at least one of the one or more writes associated with the identification tag have been written to the one of the plurality of persistence levels of the memory,
        a third instruction to make the one or more writes associated with the identification tag visible, and
        a fourth instruction to respond with at least one second indication that at least one of the one or more writes associated with the identification tag have reached a point of visibility; and
    receiving the at least one first indication that at least one of the one or more writes associated with the identification tag have been written to the one of the plurality of persistence levels of the memory.

2. The method of claim 1, further comprising:
    receiving the at least one second indication that at least one of the one or more writes associated with the identification tag have reached the point of visibility.

3. The method of claim 2, wherein the at least one of the first indication is received before the at least one second indication.

4. The method of claim 2, wherein the second indication is received before the at least one first indication.

5. The method of claim 2, wherein the at least one first indication and the at least one second indication are received at the same time.

6. The method of claim 1, wherein each persistence level of the plurality of persistence levels corresponds to an amount of time that the one or more writes associated with the identification tag will be stored at each persistence level of the plurality of persistence levels.

7. The method of claim 1, wherein the request is transmitted using peripheral component interconnect express standards.

8. A computer program product comprising at least one non-transitory computer-readable storage medium having computer-executable program code portions stored therein, the computer-executable program code portions comprising program code instructions configured to:

transmit a request to make one or more writes associated with an identification tag, the request comprising:
  the identification tag,
  the one or more writes,
  a first instruction to make the one or more writes to one of a plurality of persistence levels of a memory,
  a second instruction to respond with at least one first indication that at least one of the one or more writes associated with the identification tag have been written to the one of the plurality of persistence levels of the memory,
  a third instruction to make the one or more writes associated with the identification tag visible, and
  a fourth instruction to respond with at least one second indication that at least one of the one or more writes associated with the identification tag have reached a point of visibility; and
receive the at least one first indication that at least one of the one or more writes associated with the identification tag have been written to the one of the plurality of persistence levels of the memory.

9. The computer program product of claim 8, further configured to:
receive the at least one second indication that at least one of the one or more writes associated with the identification tag have reached the point of visibility.

10. The computer program product of claim 9, wherein the at least one first indication is received before the at least one second indication.

11. The computer program product of claim 9, wherein the at least one second indication is received before the at least one first indication.

12. The computer program product of claim 9, wherein the at least one first indication and the at least one second indication are received at the same time.

13. The computer program product of claim 8, wherein each persistence level of the plurality of persistence levels corresponds to an amount of time that the one or more writes associated with the identification tag will be stored at each persistence level of the plurality of persistence levels.

14. The computer program product of claim 8, wherein the request is transmitted using peripheral component interconnect express standards.

15. An apparatus comprising at least one processor and at least one memory including computer program code, the at least one memory and the computer program code configured to, with the at least one processor, cause the apparatus to:
transmit a request to make one or more writes associated with an identification tag, the request comprising:
  the identification tag,
  the one or more writes,
  a first instruction to make the one or more writes to one of a plurality of persistence levels of a memory,
  a second instruction to respond with at least one first indication that at least one of the one or more writes associated with the identification tag have been written to the one of the plurality of persistence levels of the memory,
  a third instruction to make the one or more writes associated with the identification tag visible, and
  a fourth instruction to respond with at least one second indication that at least one of the one or more writes associated with the identification tag have reached a point of visibility; and
receive the at least one first indication that at least one of the one or more writes associated with the identification tag have been written to the one of the plurality of persistence levels of the memory.

16. The apparatus of claim 15, further caused to
receive the at least one second indication that at least one of the one or more writes associated with the identification tag have reached the point of visibility.

17. The apparatus of claim 15, wherein the request is transmitted using peripheral component interconnect express standards.

18. A system comprising:
a requester having a first processor and a first memory including first computer program code, the first memory and the first computer program code configured to, with the first processor, cause the requester to:
  transmit a request to make one or more writes associated with an identification tag, the request comprising:
    the identification tag,
    the one or more writes,
    a first instruction to make the one or more writes to one of a plurality of persistence levels of a second memory,
    a second instruction to respond with at least one first indication that at least one of the one or more writes associated with the identification tag have been written to the one of the plurality of persistence levels of the second memory,
    a third instruction to make the one or more writes associated with the identification tag visible, and
    a fourth instruction to respond with at least one second indication that at least one of the one or more writes associated with the identification tag have reached a point of visibility; and
  receive the at least one first indication that at least one of the one or more writes associated with the identification tag have been written to the one of the plurality of persistence levels of the second memory; and
a completer having a second processor and the second memory including second computer program code, the second memory and the second computer program code configured to, with the second processor, cause the completer to:
  receive the request to make the one or more writes associated with the identification tag;
  write the one or more writes associated with the identification tag to the one of the plurality of persistence levels of the second memory; and
  transmit the at least one first indication to the requester that at least one of the one or more writes associated with the identification tag have been written to the one of the plurality of persistence levels of the second memory.

19. The system of claim 18, wherein the requester is further caused to:
receive the at least one second indication that at least one of the one or more writes associated with the identification tag have reached the point of visibility.

20. The system of claim 18, wherein the request is transmitted using peripheral component interconnect express standards.

21. The apparatus of claim 16, wherein the at least one first indication is received before the at least one second indication.

22. The apparatus of claim 16, wherein the at least one second indication is received before the at least one first indication.

23. The apparatus of claim 16, wherein the at least one first indication and the at least one second indication are received at the same time.

24. The apparatus of claim 15, wherein each persistence level of the plurality of persistence levels corresponds to an amount of time that the one or more writes associated with the identification tag will be stored at each persistence level of the plurality of persistence levels.

\* \* \* \* \*